United States Patent [19]
Zhou et al.

[11] Patent Number: 5,452,345
[45] Date of Patent: Sep. 19, 1995

[54] METERING SIGNAL LEVEL CONTROL CIRCUIT

[75] Inventors: Yan Zhou; Merle L. Miller; V. Vijayakumaran Nair; Sergio Ramirez, all of Austin, Tex.

[73] Assignee: Advanced Micro Devices, Del.

[21] Appl. No.: 184,564

[22] Filed: Jan. 21, 1994

[51] Int. Cl.⁶ .................... H04M 15/00; H04M 15/38
[52] U.S. Cl. ........................................ 379/124; 379/251
[58] Field of Search ............... 379/111, 114, 143, 126, 379/115, 121, 124, 126, 133, 134, 139

[56] References Cited

U.S. PATENT DOCUMENTS

| | | | |
|---|---|---|---|
| 5,172,407 | 12/1992 | Alemius | 379/124 |
| 5,329,588 | 7/1994 | Willocx et al. | 379/413 |

*Primary Examiner*—Stephen Chin
*Assistant Examiner*—Kevin Kim
*Attorney, Agent, or Firm*—Foley & Lardner

[57] ABSTRACT

An apparatus for controlling the magnitude of a metering signal used in a communication system includes a high pass filter and a threshold detector. The apparatus is preferably integrated on to a subscriber line audio-processing circuit (SLAC device) which is used on a line card. The device is operable with either 12 kHz of 16 kHz metering signals. The high pass filter preferably includes a shift register and an adder. The level detector preferably includes a shift register, an OR gate and an AND gate. The device preferably is utilized to reduce the echo or reflection caused by the variable impedance of subscriber lines in telephone communication systems.

20 Claims, 10 Drawing Sheets

METERING SIGNAL LEVEL CONTROL CIRCUIT

FIELD OF THE INVENTION

The present invention relates to metering signals utilized in communication systems. More particularly, the present invention relates to a metering signal generator and a metering signal level control circuit for use in a telecommunication system.

BACKGROUND OF THE INVENTION

Throughout the world, and particularly in Europe, a metering signal is used to continuously notify a customer of telephone charges. The metering signal is usually a 16 kilohertz or 12 kilohertz signal sent from a central office to a subscriber line.

The central office (office exchange) generally includes a line card having a subscriber line interface circuit (SLIC device) and a subscriber line audio-processing circuit (such as SLAC TM or DSLAC TM devices manufactured by Advanced Micro Devices). The SLIC device is an analog interface for the subscriber line generally including audio amplifiers for providing audio signals to a subscriber line. The subscriber line is generally coupled to a subscriber telephone or other customer communications equipment. The SLAC device is generally coupled to the SLIC device to transmit and receive analog signals and provides digital signals to the central office. The SLAC device generally includes analog-to-digital (A/D) converters and digital-to-analog (D/A) converters.

Generally, the line cards or other equipment in the central office are designed to provide a metering signal to the subscriber line. The voiceband impedance of the linecard is generally required by the telephone administration to be 600 ohms or greater. Unless a complex circuit is coupled with the SLIC device, the impedance of the line card is about 400 ohms or more at the metering frequency (12 or 16 KHz). The impedance of the subscriber line varies from 200 ohms to 3,000 ohms at the metering frequency. The variance in impedance is generally due to the variation in the impedance of subscriber meters and to the variable subscriber line lengths from the central office to the customer telephone or other equipment.

The voltages of the metering signal at the subscriber line vary by about three to one due to the impedance variations unless a special circuit is included to control the variability. These large variations in voltages can disadvantageously overload the audio amplifiers in the SLIC device. Also, these large variations in voltages may exceed the maximum voltage allowed by the administration.

High impedance of the subscriber line at the metering frequency (often up to 3,000 ohms) also may create large echoes or reflections of the metering signal. The voltage of echoes and reflections of the metering signal is zero at a critical value of the line impedance which is referred to as the metering balance impedance. This value is preferably close to 200 $\angle -30°$ ohms at the metering frequency.

A high impedance meter connected through a short subscriber line has an impedance far larger than the metering balance impedance. Such a high impedance of the subscriber line may cause the SLIC device or SLAC device to saturate or interrupt normal transmission and reception on the subscriber line. Also, the reflections of the metering signal at the subscriber line may also exceed the maximum voltage allowed by the administration of the telephone line.

Heretofore, communications systems have employed a transformer-based metering signal injection circuit to provide the metering signal and a filter in the transmit path to filter out the large reflections of the metering signal. The filter generally filters out all signals having a 12 kilohertz or a 16 kilohertz frequency. The signal injection transformer and filter are analog components placed on the subscriber line side or customer side of the transmission path to avoid saturating the amplifiers and converters in the SLIC device or SLAC device.

Metering signal injection transformers and filters coupled to the subscriber line (line interface) are generally costly because they require additional analog circuitry. Also, they include high voltage components which must withstand voltages up to 2,000 volts due to lightning or power crosses. Metering filters often require at least second order filtering so that only the metering signal is filtered out without disturbing the voiceband and so that the metering source has a low impedance at the metering frequency and a high impedance in the audio band. Second order (or higher) filtering is costly because precision components are needed.

Further, filters such as notch filters generally cannot be designed for both 12 kilohertz and 16 kilohertz metering signals. Additional cost is involved in a notch filter solution because no one notch filter design can accommodate both commonly used metering signal frequencies. Thus, the economies which may be realized in manufacturing a single part to address both metering signals are not available.

It would, therefore, be advantageous to generate the metering signal within the SLAC device with a programmable metering signal generator. It would also be advantageous to have a single metering signal level control apparatus which could employ low cost parts to mitigate noise caused by metering signals at all commonly used frequencies. It would also be advantageous to utilize the internal amplifiers in the SLIC device to provide the metering signal to the subscriber line.

SUMMARY OF THE INVENTION

The present invention is related to an apparatus for controlling a first parameter of a metering signal in a communication system. The communication system includes a transmit path, a receive path, and a metering signal generator. The metering signal generator includes a control input and provides a metering signal at a first frequency to the transmit path and the receive path. The apparatus includes a high pass filter and a threshold detector. The high pass filter includes a filter output and a filter input. The filter input is coupled with the transmit path. The high pass filter receives transmitted signals at the filter input and provides filtered signals at the filter output. The filtered signals are above a second frequency. The second frequency is lower than the first frequency. The threshold detector includes a threshold input coupled with the filter output, a threshold programming input connected to the user interface, and a detector output coupled with the control input. The threshold detector provides a control signal at the detector output when a second parameter of the filtered signals attains a predetermined relationship with a programmed threshold. The metering signal generator controls the first parameter in response to the control signal.

The present invention also relates to an apparatus for controlling amplitude of a metering signal in a communication system. The communication system includes a transmit path, a receive path and a metering signal circuit. The metering signal circuit includes a control input. The metering signal circuit provides a metering signal to the telephone line, the transmit path and the receive path. The apparatus includes filter means for filtering transmitted signals on the transmit path and monitor means for monitoring the metering signal. The filter means includes a filter input and a filter output. The filter input is coupled with the transmit path and receives the transmitted signals. The filter means allows the metering signal to pass from the filter input to the filter output. The monitoring means includes a threshold programming input coupled with the user interface, a monitor input coupled with the filter output and a monitor output coupled with the control input. The monitor means provides a control signal in response to the amplitude having a predetermined relationship with a programmed value. The metering signal circuit controls the amplitude in response to the control signal.

The present invention also relates to a feedback circuit for use in a communication system. The feedback circuit controls an echo from a first signal. The communication system includes a communication path and a first signal source. The feedback circuit includes measuring means for measuring the echo and a control means for controlling a parameter of the first signal. The measuring means is coupled with the communication path. The measuring means provides a measuring signal indicative of the echo. The control means is coupled with the measuring means and with the first signal source. The control means receives the measuring signal and provides a control signal to the first signal source in response to the measuring signal. The first signal source controls the parameter appropriately to reduce the echo in response to the control signal.

The present invention also relates to an apparatus for generating a metering signal in a communication system. The communication system includes subscriber line interface circuit (SLIC device) and a subscriber line. The SLIC device includes an integrated semiconductor device having a metering signal input and an output operatively coupled to the subscriber line. The apparatus includes a metering signal generator and a program input. The metering signal generator is coupled to the metering signal input to provide the metering signal for injection on the subscriber line through the integrated semiconductor device. The program input is coupled to the metering signal generator. The program input receives a factor related to a parameter of the metering signal. The metering signal generator provides a metering signal having the parameter.

The present invention further relates to an apparatus for providing a metering signal in a communication system. The communication system including a ramp signal generator for providing a ramp signal at a ramp signal output, the ramp signal changing from a first level to a first threshold level or to a maximum level and later changing back to the first level. The apparatus includes amplifier means for receiving the ramp signal and providing the metering signal. The amplifier means having a first input coupled with the ramp signal output and a gain input. The amplifier means providing the metering signal in response to a gain signal received at the gain input. The gain control means has a gain control output coupled with the gain input and provides the gain signal so that the metering signal reaches a second threshold level as the ramp signal reaches or nears the first threshold.

It is an object of the present invention to provide a single metering level control apparatus which could employ low precision, low cost parts to mitigate noise caused by metering signals at all commonly used metering signal frequencies.

It is another object of the present invention to pass the metering signal through the amplifiers of the SLIC device rather than utilizing an expensive injection circuit including a transformer.

It is yet another object of the invention to integrate a programmable metering signal generator within the SLAC device so that the voltage of metering may be programmed for an appropriate level for a specific subscriber line.

It is further object of the present invention to provide a metering signal which slowly ramps up to a threshold level so that noise associated with the metering signal is further reduced.

Further objects and features of the present invention will be apparent from the following specification and claims when considered in connection with the accompanying drawings illustrating the preferred exemplary embodiment of the present invention.

BRIEF DESCRIPTION OF THE DRAWINGS

The invention will hereafter be described with reference to the accompanying drawings, wherein like reference numerals denote like elements in the various drawings, and.

DETAILED DESCRIPTION OF THE PREFERRED EXEMPLARY EMBODIMENT

Figure 1:
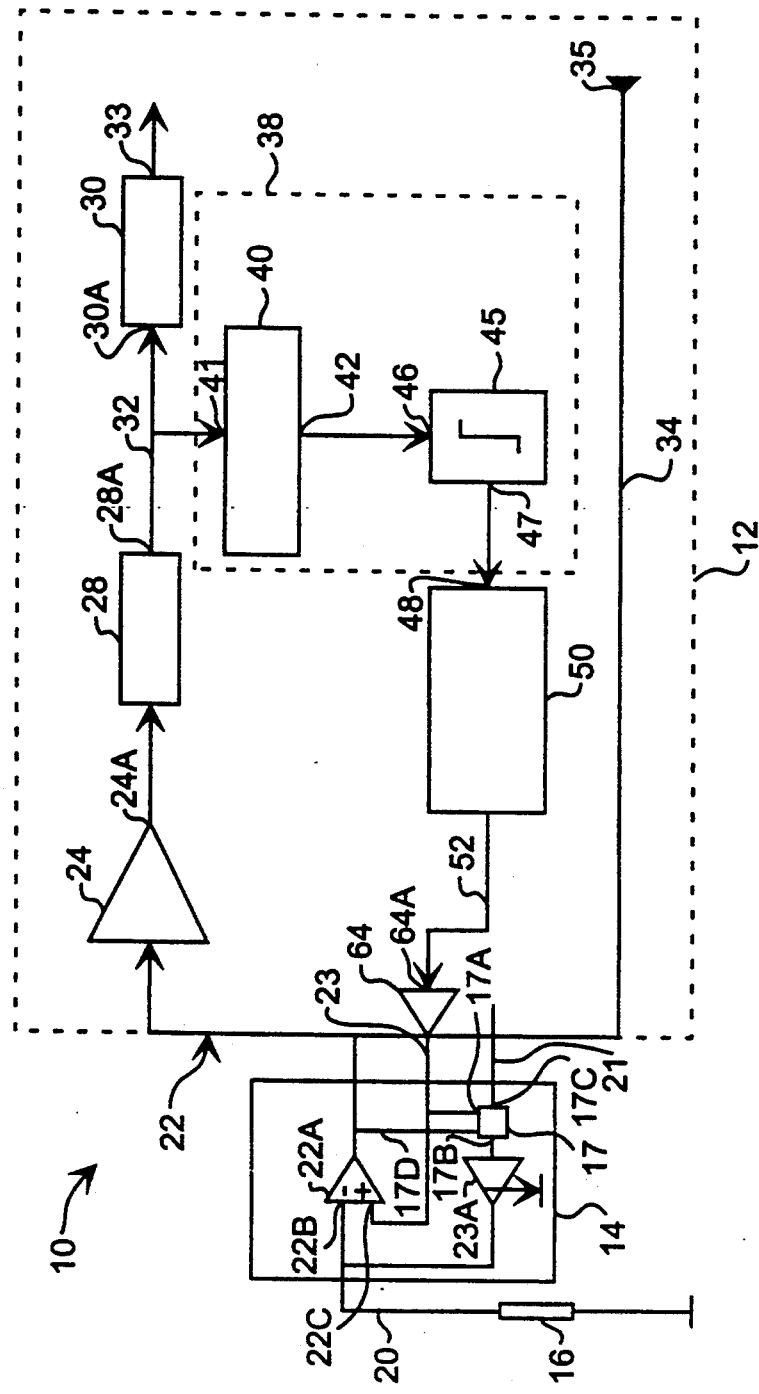
FIG. 1 is a schematic block diagram of a communication system including an exemplary preferred embodiment of the present invention.

FIG. 1 is a schematic block diagram of a communication system including an exemplary embodiment of the present invention. In FIG. 1, a communication system 10 is preferably a telephone communication system including a SLAC device 12, a SLIC device 14, and a telephone 16. SLIC device 14 is coupled to telephone 16 via a subscriber line 20.

SLIC device 14 is coupled to SLAC device 12 via an analog receive path 21, an analog transmit path 22, and an analog metering input line 23. Metering input line 23 is operatively coupled through an internal summing amplifier 22A in SLIC device 14 to analog transmit path 22. Amplifier 22A has a non-inverting input 22C coupled with input line 23 and an inverting input 22B coupled with subscriber line 20. Amplifier 22A in SLIC device 14 is preferably configured to provide compromise metering cancellation to analog transmit path 22 to reduce or suppress the metering signal which is transmitted on analog transmit path 22.

Figure 1A:
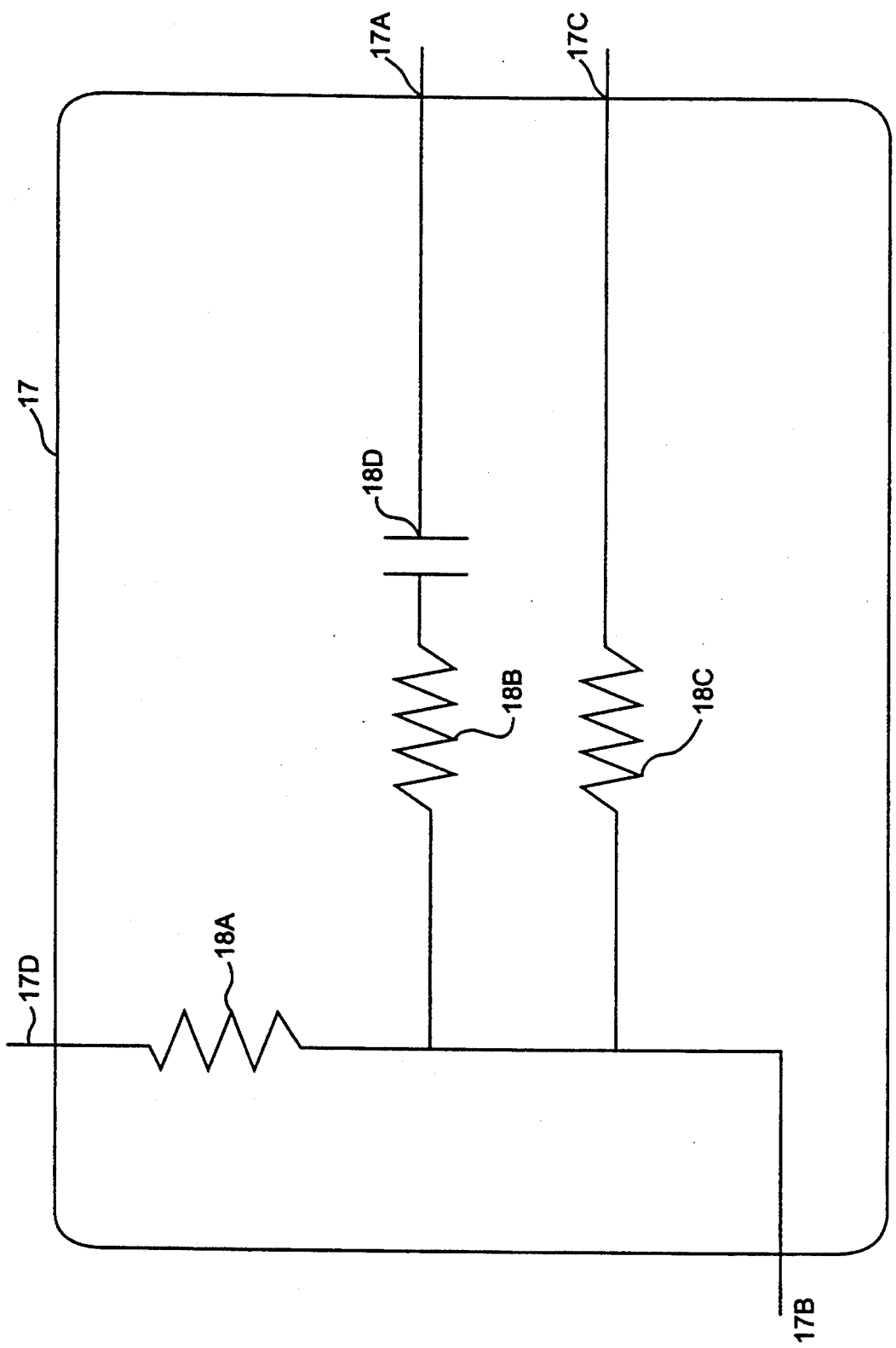
FIG. 1A is a schematic diagram of a network illustrated in FIG. 1.

The input of current mode amplifier 23A is coupled to a network 17. With reference to FIG. 1A, network 17 is preferably comprised of a resistor 18A, a resistor 18B, a resistor 18C and capacitor 18D. Resistors 18A, 18B, and 18C are coupled to an output 17B of the network 17. Resistor 18C is coupled to analog receive path 21 at an input 17C. Resistor 18A is coupled to analog transmit path 22 at an input 17D. Capacitor 18D is coupled in series to resistor 18B and is connected to metering input line 23 at an input 17A.

SLAC device 12 (FIG. 1) preferably includes an apparatus 38, an A/D converter 24, a first decimeter 28, a second decimeter 30, a metering signal generator 50, and a buffer 64. SLAC device 12 is preferably a programmable SLAC device with impedance matching and echo suppression.

A/D converter 24 is coupled to analog transmit path 22. First decimeter 28 is coupled to an output 24A of A/D converter 24. An output 28A of first decimeter 28 is coupled to a digital transmit path 32. Digital transmit path 32 is coupled to a filter input 41 of apparatus 38 and to an input 30A to second decimeter 30. Second decimeter 30 provides a transmit path output 33 for other devices associated with SLAC device 12.

A control signal output 47 of apparatus 38 is coupled to a control input 48 of metering signal generator 50. A metering signal generator output 52 is coupled to an input 64A of buffer 64. SLAC device analog receive path 34 includes a receive path input 35 which is coupled to other components associated with SLAC device 12.

Apparatus 38 includes a high pass filter 40 and a threshold detector 45. High pass filter 40 includes filter input 41 and a filter output 42. Filter output 42 is coupled to a threshold detector input 46.

With reference to FIG. 1, the operation of communication system 10 including apparatus 38 is as follows. Apparatus 38 is preferably integrated with SLAC device 12 to advantageously reduce costs associated with the line card (not shown) in which the present invention would be advantageously employed. Apparatus 38 provides control of the amplitude of the metering signal in communication system 10 with minimal real estate or circuitry added to SLAC device 12.

Apparatus 38 preferably provides a feedback signal to metering signal generator 50 to control the amplitude of the echo of the metering signal on subscriber line 20, analog receive path 21, analog transmit path 22, and digital transmit path 32. Alternatively, apparatus 38 could be employed in an analog form coupled with analog receive path 21 and analog transmit path 22.

Telephone 16 (or other communication equipment) receives and transmits electrical signals representative of audio sounds or other data on subscriber line 20. SLIC device 14 preferably supports various line card functions such as battery feed, over-voltage protection, ringing signal, supervision of the line, hybrid two-wire to four-wire conversion, and test ("BORSHT") functions for interfacing telephone 16 to analog receive path 21, and analog transmit path 22.

SLIC device 14 provides analog electrical signals at analog transmit path 22 to SLAC device 12, and receives analog signals from SLAC device 12 at analog receive path 21. SLIC device 14 receives the metering signal at analog metering input line 23, and amplifier 23A injects the metering signal into subscriber line 20. The metering signal at input line 28 is provided to network 17 which operates to add the metering signal at input 17A to the signals on analog receive path 23 at input 17C. Network 17 provides the added (mixed) signals at output 17B to current mode amplifier 23A. Therefore, the location of metering signal generator 50 on the line card side of SLIC device 14 advantageously allows the metering signal to be input to the subscriber line through amplifier 23A.

Preferably, network 17 includes resistor 18B (FIG. 1A) and capacitor 18D coupled in series between input 17A and output 17B. The resistor 18B and capacitor 18D are configured to adjust the phase (tune to balance subscriber line 20) of the metering signal in order to cancel the metering signal on analog transmit path 22. SLIC device 14 also operates to reduce the amplitude of the metering signal on analog transmit path 22 by utilizing internal summing amplifier 22A to provide cancellation.

SLAC device 12 receives analog signals on analog transmit path 22. A/D converter 24 converts the analog signals on analog transmit path 22 to digital transmitted signals. The digital transmitted signals are decimated by first decimeter 28 and provided to digital transmit path 32. Digital transmit path 32 generally refers to the entire medium for communicating the digital transmitted signals in SLAC device 12. A communication path or transmit path generally refers to any portion or portions of the entire medium, digital or analog, for communicating signals between telephone 16 and the central office (not shown).

The digital transmitted signals on digital transmit path 32 are further decimated by second decimeter 30. Second decimeter 30 provides the digital transmitted signals on transmit path 32 to digital transmit path output 33 which provides the digital transmitted signals to the central office (not shown) or other circuitry in SLAC device 12.

Preferably, A/D converter 24 samples the signals on analog transmit path 22 at a sampling rate of approximately 4 megahertz (MHz). First decimeter 28 samples the digital transmitted signals from A/D converter 24 at a sampling rate of 4 MHz. Second decimeter 30 further samples the digital transmitted signals on the digital transmit path 32. Decimeters 28 and 30 also may perform filtering operations.

SLAC device 12 receives digital received signals from other equipment coupled to SLAC device 12, or other internal components in SLAC device 12 at receive path input 35. SLAC device analog receive path 34 provides analog received signals to analog receive path 23.

Metering signal generator 50 provides a metering signal of 12 or 16 KHz at metering signal generator output 52 to analog metering input line 23. Metering signal generator 50 is preferably programmable to provide metering signals of different amplitudes. Therefore, the amplitude of the metering signal at subscriber line 20 may be advantageously controlled by programming the metering signal to provide the appropriate amplitude for the metering signal. The programming of metering signal generator 50 is discussed in more detail below with respect to FIG. 3.

Apparatus 38 preferably provides feedback control the amplitude of the metering signal via control signal output 47. Other parameters such as frequency or power level may be controlled by apparatus 38 to reduce reflections or echoes of the metering signal.

Apparatus 38 preferably receives the transmitted digital signals on digital transmit path 32 at filter input 41. High pass filter 40 preferably receives the digital transmitted signals at filter input 41 and provides filtered signals at filter output 42. Thus, apparatus 38, including high pass filter 40, advantageously does not affect the communication of digital transmitted signals on digital transmit path 32. Preferably, the filter rejects the signal between 0 and 3400 Hz (audio band) and passes 12 and 16 kHz metering signals to the filter output 42. Most audio signal energy in normal speech is at a frequency around 1 KHz.

Preferably, high pass filter 40 is designed so that high pass filter 40 has a −2.322 dB response at 16 KHz, a −4.723 dB response at 12 KHz, a −15.56 dB response at 3.4 KHz, and a −26.18 dB response at 1.0 KHz. Preferably, the overall audio signal rejection is considerably higher than 13 dB and 10.8 dB audio signal rejection for applications using 16 KHz and 12 KHz metering signals, respectively. This preferred response of high pass filter 40 advantageously allows apparatus 38 to be used with both 12 KHz and 16 KHz metering signals.

High pass filter 40 provides the filtered signals at filter output 42 to threshold detector input 46. Threshold detector 45 preferably generates a control signal at control signal output 47 when the filtered signals have a parameter which reaches a predetermined threshold. Preferably, threshold detector 45 generates the control signal when the amplitude of the filtered signals reaches a predetermined or programmed level. The threshold is preferably set by a digital number. For example, the threshold may be set to 2000H (in hexa-decimal format) when the range of the transmitted digital signals is from approximately −4000H to +3FFFH.

Preferably, the control signal at control signal output 47 causes metering signal generator 50 to limit the amplitude of the metering signal at metering signal output 52. Preferably, the control signal is a 1 bit signal provided to metering signal generator 50.

Figure 2:
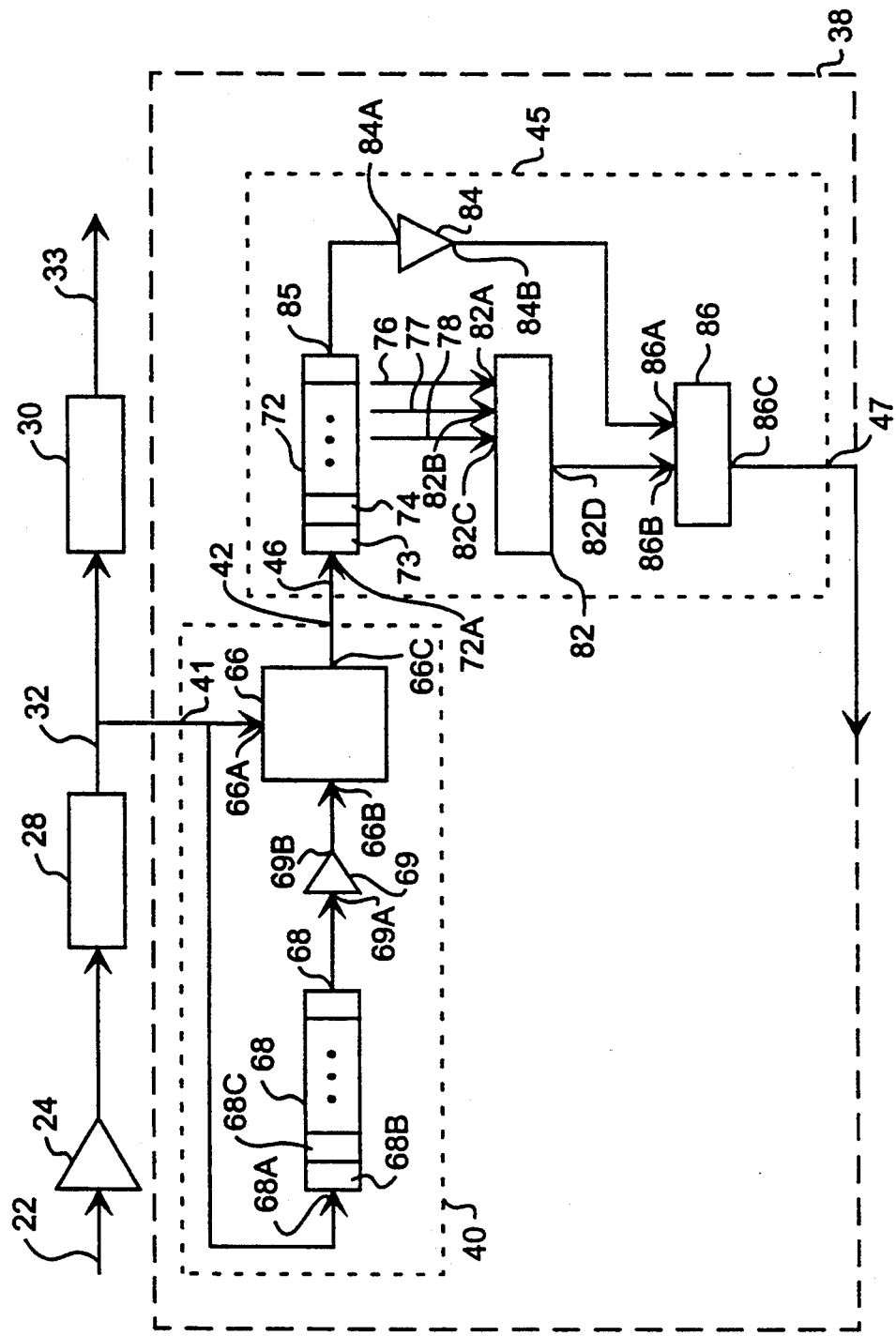
FIG. 2 is a more detailed schematic block diagram of the preferred embodiment of the present invention.

FIG. 2 is a more detailed schematic block diagram of the preferred embodiment of the present invention. In FIG. 2, apparatus 38 is shown coupled to digital transmit path 32. High pass filter 40 includes a shift register 68, an invertor 69, and an adder 66. Shift register 68 preferably includes 15 bit positions, such as bit positions 68B, 68C. Filter input 41 is coupled with a first input 66A of adder 66 and a shift register input 68A of shift register 68. An output 68B of shift register 68 is coupled to an input 69A of invertor 69. An output 69B of invertor 69 is coupled to a second input 66B of adder 66. Filter output 42 is coupled to an output 66C of adder 66.

Threshold detector 45 includes a shift register 72, an invertor 84, an decode device 85 and an AND logic device 86. Shift register 72 is preferably programmable to receive a particular number of most significant bits. Threshold detector input 46 is coupled to an input 72A of the shift register 72. A sign bit position 85 of shift register 72 is coupled to an input 84A of invertor 84. An output 84B of invertor 84 is coupled to a first input 86A of AND logic device 86.

Shift register 72 preferably includes 15 hierarchically arranged shift register bit positions such as bit positions 73, 74. Selected shift register bit positions 76, 77 and 78 are coupled to inputs 82A, 82B and 82C of OR logic device 82, respectively. An output 82D of OR logic device 82 is coupled to a second input 86B of AND logic device 86. An output 86C of AND logic device 86 is coupled to detector output 47.

In operation, apparatus 38 preferably provides direct feedback control of metering signal generator 50 to reduce echo in communication system 10. Apparatus 38 preferably receives the filtered signals at filtered input 41 in a serial data stream having a 15 bit word length from first decimeter 28. The serial implementation of apparatus 38 reduces the number of components and silicon area required for the proper operation of apparatus 38.

High pass filter 40 preferably provides a response represented by the following equation:

$$HPF(z)=1-z^{-31}\ ^{1}.$$

High pass filter 40 is preferably implemented by subtracting a delayed sample of the digital transmitted signals stored in shift register 68 from a current sample of the digital transmitted signals on transmit path 32. Preferably, first input 66A of adder 66 samples the digital transmitted signals on digital transmit path 32 at a sampling rate of 128 KHz, and second input 66B of adder 66 samples the delayed digital transmitted signals from invertor 69 at a sampling rate of 128 KHz. Preferably, shift register 68 operates to delay the sample of the digital transmitted signals at shift register input 68A one cycle of the sampling rate.

Invertor 69 inverts, or provides a bit inversion function, of the delayed sample at the shift register output 68B. Therefore, adder 66 preferably adds a current sample of the digital transmitted signals on transmit path 32 with a delayed sample of the digital transmitted signals at invertor output 69B. Thus, adder 66 essentially adds the current sample to the two's complement (inverse plus one) of the delayed sample to perform a subtraction operation in accordance with the implementation of high pass filter 40. The addition of one in the two's complement operation is ignored because only large metering signals are important. Therefore, only the higher frequency digital transmitted signals are provided as the filtered signals at filter output 42. The implementation of high pass filter 40 including shift register 68 and adder 66 allows apparatus 38 to be advantageously implemented with minimal circuitry.

Adder 66 provides the filtered signal at filter output 42 to threshold detector 45. Threshold detector 45 receives the filtered signal from filter output 42 at threshold detector input 46. Shift register 72 stores the filtered signal in 15 bit positions such as bit positions 73 and 74 as a measured signal. Selected bit positions 76, 77 and 78 are coupled to decode device 82. Sign bit position 85 is set to 1 when the filtered signal is negative. Sign bit position 85 is coupled to input 84A.

Decode device 82 is preferably an OR logic device which advantageously indicates when the filtered signal is above a predetermined threshold. Only selected bit positions 76, 77 and 78 are necessary because selected bit positions 76, 77 and 78 represent larger numbers indicative of a programmed threshold. For example, selected bit position 76 may represent the digital number 2000H instead of using all 15 bit positions such as bit positions 73 and 74. By using only selected bit positions 76, 77 and 78, an error of approximately 13% may be introduced into threshold detector 45. However, using selected bit positions 76, 77 and 78 reduces the complexity of threshold detector 45 which may therefore be advantageously implemented with minimal components. Decode device 82 is preferably programmable to provide selected thresholds.

Invertor 84 and AND logic device 85 operate to disable threshold detector 45 when the filtered signal is negative. AND logic device 86 provides control signal at the control signal output 47 for eventual reception by metering signal generator 50. Alternatively, other logic or algorithms may be utilized to generate the control signal in response to a filtered signal which indicates that a large echo is present.

Figure 3:
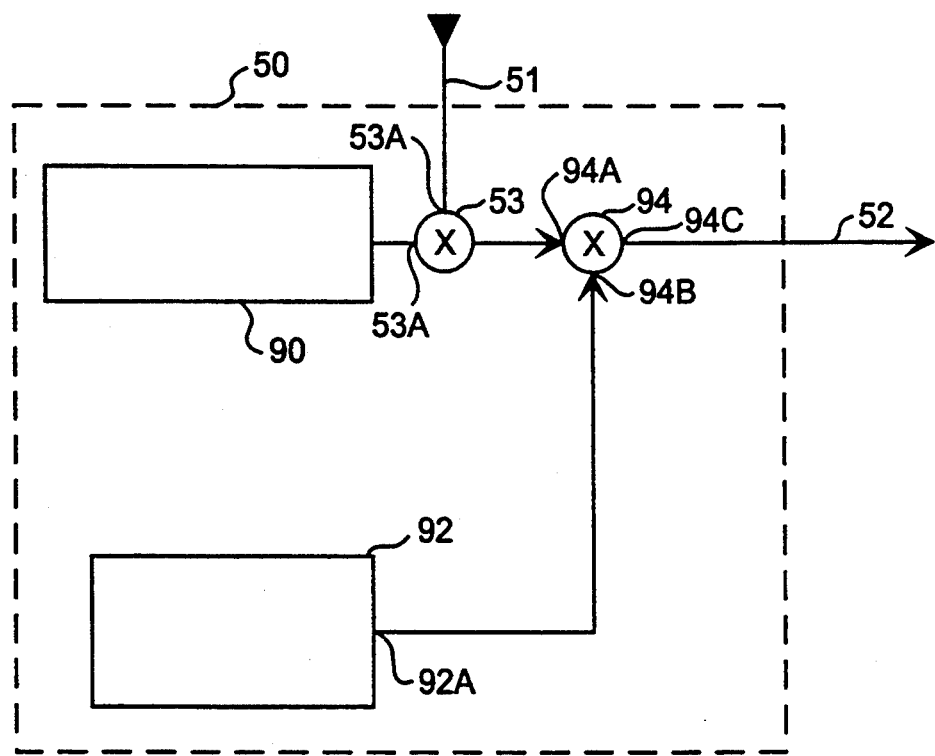
FIG. 3 is a schematic block diagram of a metering signal generator in accordance with another preferred exemplary embodiment of the present invention for use in the communication system illustrated in FIG. 1.

FIG. 3 is a schematic block diagram of a metering signal generator for use in the communications system illustrated in FIG. 1. In FIG. 3, metering signal generator 50 includes a sine wave generator 90, an up/down ramp generator 92, a multiplier 53 and a multiplier 94. Sine wave generator 90 is coupled with a first input 53A of multiplier 53.

A second input 53B of multiplier 53 is coupled with a programming input 51. Programming input 51 allows the user to program the amplitude of the metering signal by providing a factor at programming input 53B. An output 92A of up/down ramp generator 92 is coupled with a second input 94B of multiplier 94. An output 94C of multiplier 94 is coupled to metering signal generator output 52.

In operation, sine wave generator 90 provides a sine wave to first input 53A of multiplier 53. Program input 51 provides a factor representing values $2^{N/8}$ where $-31 \leq N \leq 0$. The factor at input 53A is multiplied by the sine wave at input 53B and the product is provided to first input 94A of multiplier 94.

Up/down ramp generator 92 provides a digital signal to the second input 94B of multiplier 94. Multiplier 94 preferably multiplies the signals from the sine wave generator 90 and up/down ramp generator 92 to provide the metering signal. The metering signal is preferably a 12 or 16 KHz amplitude modulated signal. The signal at output 92A of up/down ramp generator 92 preferably indicates the size or amplitude of the sine wave provided at metering signal generator output 52.

Programming input 51 allows the amplitude of the metering signal to be conveniently programmed for the particular impedance of the line card (not shown) or subscriber line 20 (FIG. 1). Thus, the metering signal generator 50 may be advantageously programmed to provide the appropriate amplitude metering signal at the subscriber line 20. Metering signal generator 50 conveniently allows the amplitude of the metering signal to be programmed for communication system 10 when the impedance load of the subscriber line 20 and telephone 16 is balanced by network 17 (FIG. 1).

For example, the metering echo voltage is 0 at a critical value of impedance of subscriber line 20 which is referred to as the metering balance impedance. This value is preferably close to $200\phi - 30°$ ohm at the metering frequency. Therefore, the metering signal generator 50 may be programmed within SLAC device 12 to advantageously provide the appropriate amplitude for the metering signal at the subscriber line 20 when the load for the communication system 10 is balanced.

Figure 4:
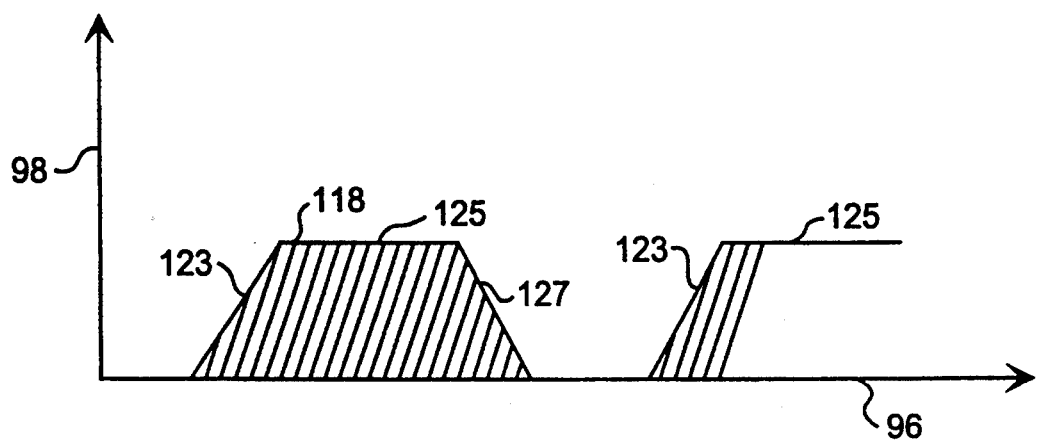
FIG. 4 is a waveform diagram of an amplitude modulated metering signal.

FIG. 4 is a waveform diagram of an amplitude modulated metering signal. In FIG. 4, an amplitude modulated metering signal 118 at metering signal generator output 52 is illustrated. The Y axis 98 of FIG. 4 represents signal amplitude and the X axis 96 of FIG. 4 represents time. The amplitude of amplitude modulated metering signal 118 across portions 123, 125 and 127 is generally controlled by the magnitude of the signal at output 92A of up/down ramp generator 92. The magnitude of the peak amplitude at flat portion 125 is generally controlled by the factor at program input 51 coupled to multiplier 53 (FIG. 3). Amplitude modulated metering signal 118 generally includes ascending signal portion 123, flat signal portion 125, and descending signal portion 127.

Figure 5:
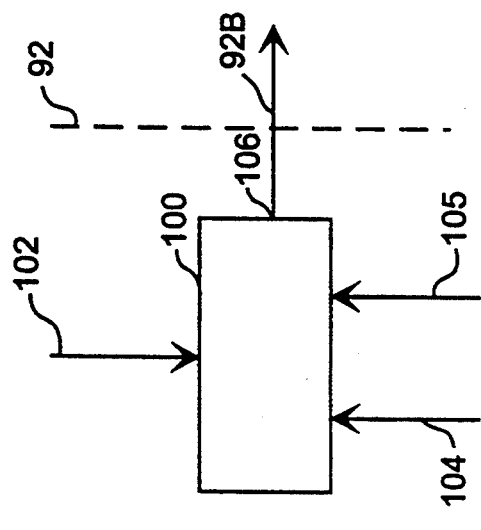
FIG. 5 is a block diagram of the up/down ramp generator illustrated in FIG. 3 including an up/down counter.

FIG. 5 is a block diagram of the up/down ramp generator illustrated in FIG. 3 including an up/down counter. In FIG. 5, an up/down counter 100 includes a hold signal input 102, a count down input 104, a count up input 105 and an up/down counter output 106.

Figure 6:
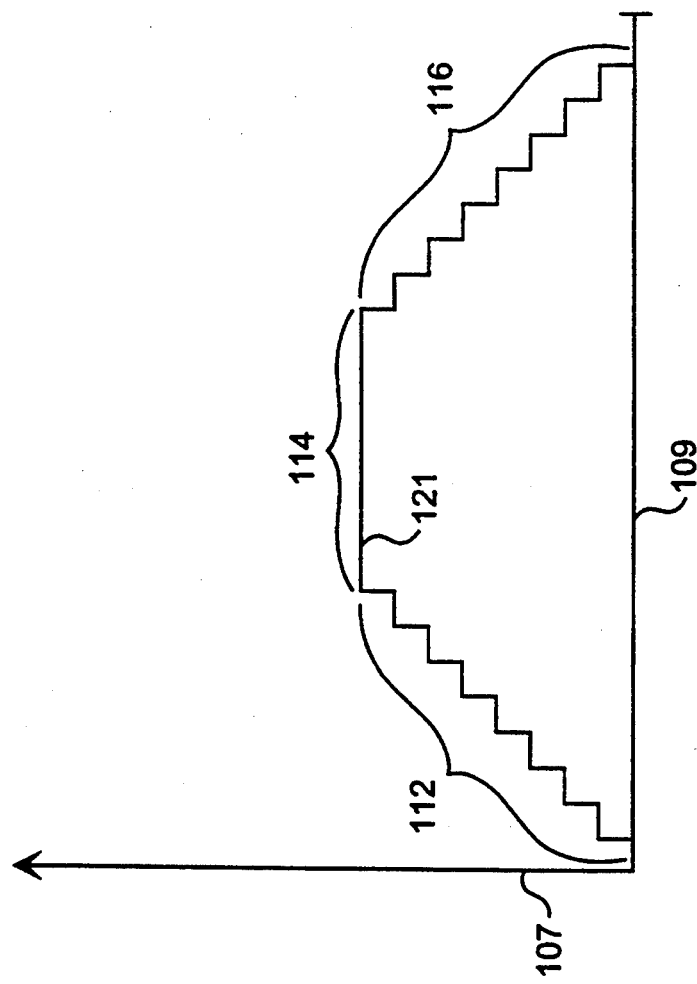
FIG. 6 is a waveform diagram of an up/down ramp signal.

FIG. 6 is a waveform diagram of an up/down ramp signal. In FIG. 6, the Y axis 107 represents signal amplitude, and the X axis 109 represents time. An up/down ramp signal 121 includes a signal portion 112, a signal portion 114 and a signal portion 116. Signal portion 112 is ascending, signal portion 114 is flat, and signal portion 116 is descending.

The generation of amplitude modulated metering signal 118 (FIG. 4) may be described with reference to FIGS. 3-6. Up/down counter 100 controls the amplitude of amplitude modulated metering signal 118 by providing up/down ramp signal 121 to multiplier 94. Signal portion 112 of the signal at up/down counter output 106 (FIG. 5) is generated when a signal is provided at count up input 105 unless a predetermined maximum value is reached. Signal portion 114 is generated when a signal is provided at hold signal input 102 or when the predetermined maximum value is reached. Up/down counter 100 provides signal portion 116 when a signal is provided at count down input 104.

A form of signal 121 at up/down counter output 106 is provided at second input 94B of multiplier 94. The multiplication of signal portions 112, 114 and 116 at second input 94B with the digital sine wave at first input 94A provide amplitude modulated metering signal 118 at the output 106. More particularly, multiplier 94 provides ascending signal portion 123 of the amplitude modulated metering signal 118 in response to the signal portion 112 at second input 94B, and multiplier 94 provides flat signal portion 125 in response to the signal portion 114 at second input 94B. Also, multiplier 94 provides descending signal portion 127 in response to signal portion 116 at second input 94B.

Preferably, other circuitry within SLAC device 12 or other devices will provide the signals on the count down input 104 and count up 105 for generating amplitude modulated metering signal 118. Preferably, hold input 102 is coupled to control input 48 (FIG. 1).

Preferably, threshold detector 45 provides the control signal (hold signal) on control signal output 47 (FIG. 1) to hold signal input 102 (FIG. 5). Up/down counter 100 provides ascending signal portion 112 until the control signal (hold signal) is provided on the hold signal input 102 from threshold detector 45 (FIG. 1). If threshold detector 45 does not provide the control signal, up/down counter 100 provides ascending signal portion 112 until the maximum value is reached or until a predetermined maximum ramp value is reached. Generally, up/down counter 100 counts down until it reaches zero in response to the signal on the count down input 104.

As previously discussed with reference to FIGS. 1 and 2, threshold detector 45 advantageously provides the control signal when the amplitude of the filtered signal is above a threshold. Apparatus 38 advantageously measures the amplitude of metering signal 118 on transmit path 32 and limits the amplitude of metering signal 118 when a predetermined threshold is reached. Thus, metering signal generator 50 is prevented from increasing the amplitude of amplitude modulated metering signal 118 in response to the control signal. Hence, the control signal prevents the amplitude of amplitude modulated metering signal 118 from obtaining amplitudes or levels which are too high due to echoes or reflections.

Figure 7:
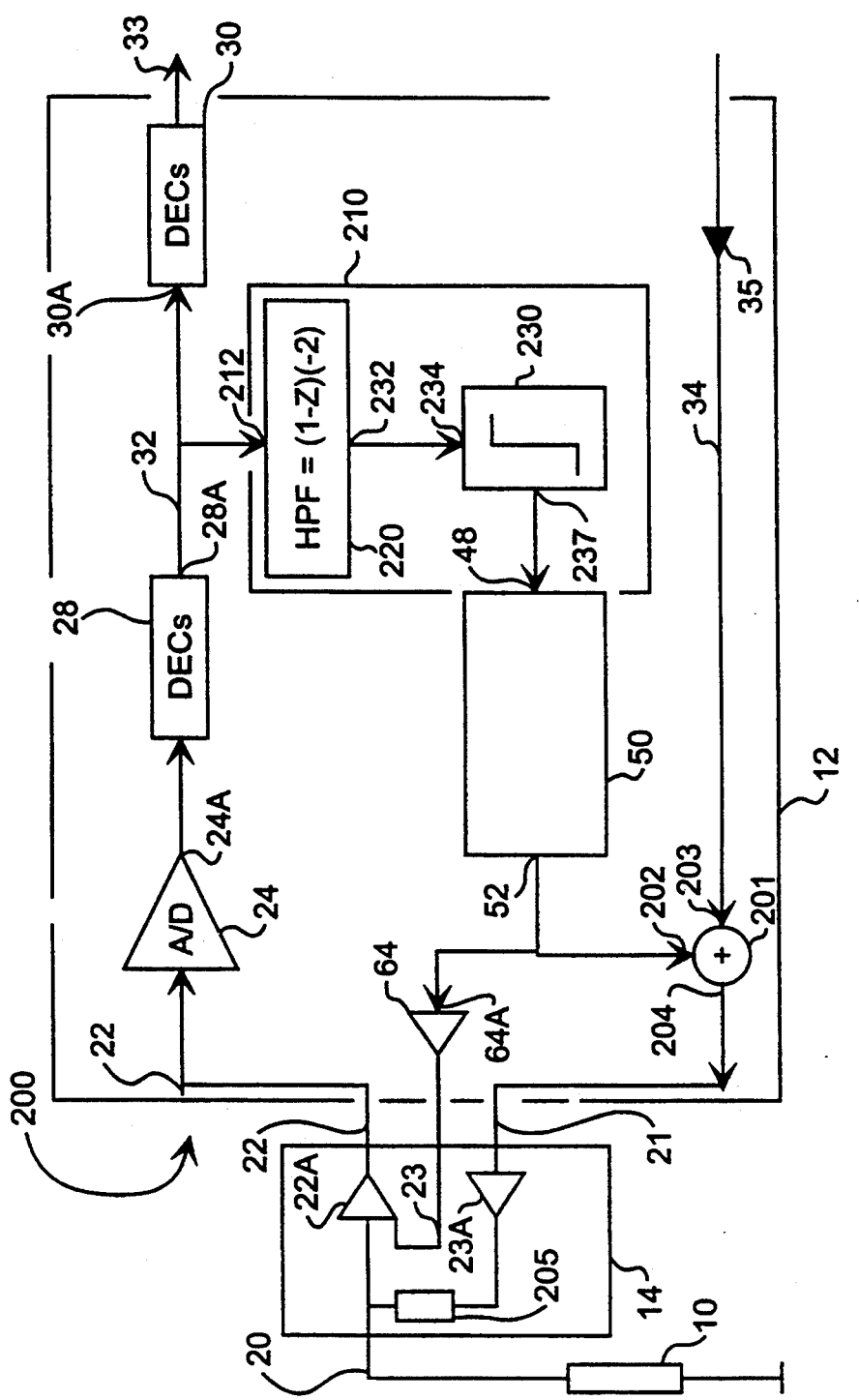
FIG. 7 is a schematic block diagram of a communication system including a second exemplary embodiment of the present invention.

FIG. 7 is a schematic block diagram of a communication system including a second exemplary embodiment of the present invention. In FIG. 7, a communication system 200 is preferably a telephone communication system including SLIC device 14, SLAC device 12, and telephone 16. Communication system 20 is similar to communication system 10 discussed with reference to FIG. 1 wherein like designators indicate like components.

Communication system 200 is shown in a schematic form for illustration purposes and includes an adder 201 having an adder input 202, an adder input 203, and an adder output 204. Adder input 202 is coupled to metering signal generator output 52 and adder input 203 is coupled to SLAC device receive path 34. Adder 201 provides a combined signal including the metering signal from metering signal output 52 and signals from receive path 34 to adder output 204 which is coupled to analog receive path 21. Adder 201 and impedance circuit 205 in SLIC device 14 are shown for illustration purposes only and SLAC device 12 and SLIC device 14 operate substantially the same as SLIC device 14 and SLAC device 12 shown in FIG. 1.

Apparatus 210 includes a second order high pass filter 220 and a threshold detector 230. High pass filter 220 includes a filter input 212 coupled to transmit path 32 and a filter output 232 coupled to threshold detector input 234. Threshold detector output 237 is coupled to control input 48 of metering signal generator 50.

High pass filter 220 provides accurate second order filtering of signals at filter input 212. High pass filter 220 is designed so that high pass filter 220 has a −4.645 dB response at 16 KHz, −9.446 dB response at 12 KHz, −31.12 dB response at 3.4 KHz, and −52.33 dB response at 1.0 KHz. Preferably, the overall audio signal rejection is considerably higher than 26 or 21 dB at 16 and 12 KHz metering signals, respectively. High pass filter 210 provides filtered signals at filter output 232 to detector input 234.

Threshold detector 230 preferably generates a control signal at control signal output 237 when the filtered signals have a parameter which reaches a predetermined threshold. Preferably, threshold detector 230 generates the control signal when the amplitude of the filtered signals at input 24 reach a predetermined level or programmed level. Alternatively, threshold detector 230 may generate the control signal when the measured parameter falls below a threshold, or equals a threshold.

Preferably, the control signal at control signal output 237 causes metering signal generator to limit the amplitude of the metering signal at metering signal output 52. Preferably, the control signal is a 1-bit signal provided to metering signal generator 50, although a multi-bit signal or serial control signal may be used to further control metering signal generator 50.

Figure 8:
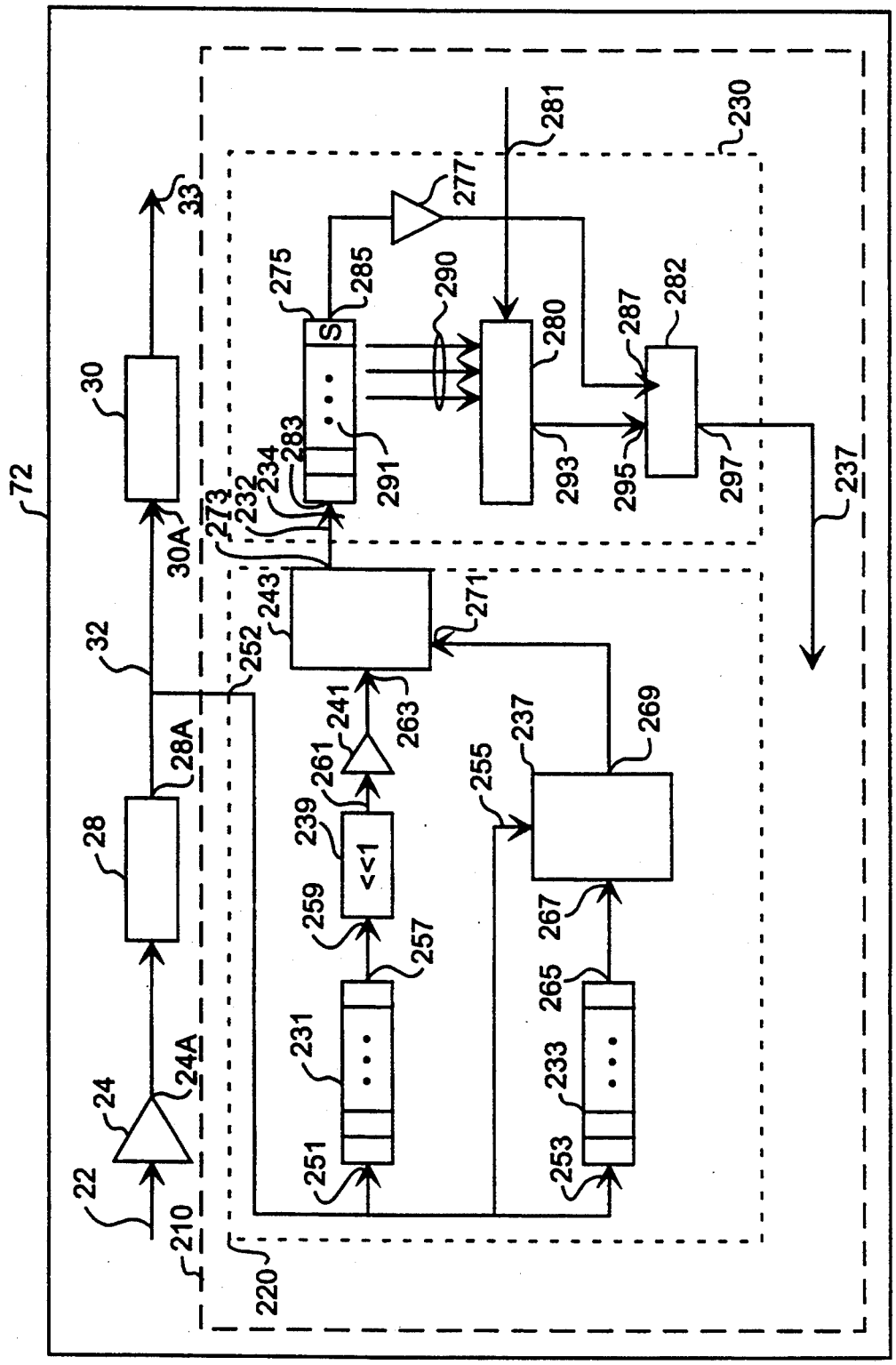
FIG. 8 is a more detailed schematic block diagram of the second preferred embodiment of the present invention.

FIG. 8 is a more detailed schematic block diagram of the second preferred embodiment of the present invention. In FIG. 8, high pass filter 220 includes a shift register 231, a shift register 233, a bit adder 237, a shifter 239, an invertor 241, and a bit adder 243. Shift registers 231 and 233 are similar to shift register 68, and adders 269 and 270 are similar to adder 66 discussed with reference to FIG. 2.

Filter input 212 is coupled to a shift register input 251 of shift register 231, a shift register input 253 of shift register 233, and an adder input 255 of bit adder 237. Shift register output 257 of shift register 231 is coupled to an input 259 of shifter 239. An output 261 of shifter 239 is coupled to an adder input 263 of bit adder 243 through an invertor 241.

A shift register output 265 of shift register 233 is coupled to an adder input 267 of bit adder 237. An adder output 269 of bit adder 237 is coupled to an adder input 271 of bit adder 243. An output 273 of bit adder 243 is provided to filter output 232.

Threshold detector 230 includes a shift register 275 similar to shift register 72 (FIG. 2), an invertor 277, a decode device 280, and an AND logic device 282. Detector input 24 is coupled to shift register input 283 and filter output 232. Sign bit position 285 is provided to input 287 of AND device 282 through invertor 277. Decoder inputs 290 of decoder 80 are coupled to predetermined bit positions 291 of shift register 283. An output 293 of decode device 280 is coupled with an input 295 of AND logic device 282. An output 297 of AND logic device 282 is provided as threshold detector output 237.

Operation of apparatus 210 is similar to the operation of apparatus 38 discussed above with reference to FIG. 2. Apparatus 210 preferably provides direct feedback control of metering signal generator 52 to reduce echo and otherwise control the voltage level of the metering signal on subscriber line 20 in communication system 200. Apparatus 210 preferably receives the filtered signals at filter input 212 in a serial data stream having a 15-bit word length from first decimeter 28. The serial implementation of apparatus 220 reduces the number of components and real estate required for the proper operation of apparatus 220.

High pass filter 220 preferably provides a response represented by the following equation:

$$HPF(Z)=(1-Z^{-1})^2=1-2Z^{-1}+Z^{-2}$$

The second order filtering as represented by the above equation improves the rejection of voice band signals and allows operation with smaller metering voltages.

This improved rejection is necessary for proper operation of communication system 200 when controlling the voltages of the metering signal at subscriber line 20. Controlling voltages of the metering signal at subscriber line 20 requires higher precision than echo clipping prevention operations of apparatus 210.

High pass filter 220 is preferably implemented by adding a twice delayed sample of the digital transmitted signals stored in shift register 233 from a current sample of the digital transmitted signals on transmit path 32 and a once delayed sample of the digital transmitted signal stored in shift register 231 multiplied by −2.

More particularly, shift register 233 samples the digital transmitted signals on digital transmit path 32 at a sampling rate of 128 KHz. Shift register 233 operates to delay the sample of digital transmitted signals at shift register input 253 for two cycles of the sampling rate. Shift register output 265 provides the twice delayed samples to adder input 267 of bit adder 269. Adder input 255 of bit adder 269 samples the digital transmitted signals on digital transmit path at a sampling rate of 128 KHz. Bit adder 269 adds the twice delayed samples at adder input 267 to the current samples at adder input 255 and provides the sum at adder output 269 to adder input 271 of bit adder 243. Shift register 231 samples the digital transmitted signals on digital transmit path 32 at shift register input 251 at a sampling rate of 128 KHz.

Shift register 231 operates to delay the sample for one cycle of the sampling rate. Shift register output 257 provides the once delayed sample to input 259 of shifter 239. Shifter 239 operates to multiply the sample in shift register 231 by 2. Shifter 239 provides double (multiplied by 2) the sample in shift register 251 at output 261 to invertor 241. Invertor 241 operates to multiply the sample at output 261 by −1.

Bit adder 243 receives the once delayed sample multiplied by −2 at adder input 263. Bit adder 243 adds the sum at adder input 271 with the once delayed sample in shift register 231 multiplied by −2. Adder 243 provides the sum at adder output 273. Thus, adder 243 provides a second order filtered signal at filter output 232 to detector input 234. Therefore, only the higher frequency digital transmitted signals are provided as filtered signals at filter output 232.

Shift register input 283 receives the filtered signals at detector input 234 and stores the filtered signal in bit positions such as bit positions 291 as a measured signal. Decode device 280 is programmable via program input 281. Decode device 280 advantageously indicates when the filtered signal is above a predetermined threshold. Thus, decode device 280 is programmable to provide selected thresholds.

The thresholds represented by decode device 280 may be increased or decreased by skipping a first bit position or second bit position of bit positions 291. The skipping of bit positions 291 operates to multiply the filtered signal in shift register 275 by 2, thereby effectively dividing the threshold by 2. Shift register 275 is programmable to skip the bit positions. Decode device 280 and AND logic device 282 operate to provide the control signal at threshold detector output 237. Decode device 280 and AND logic device 282 operate similar to decode device 82a and AND logic device 86 discussed with reference to FIG. 2.

Figure 9:
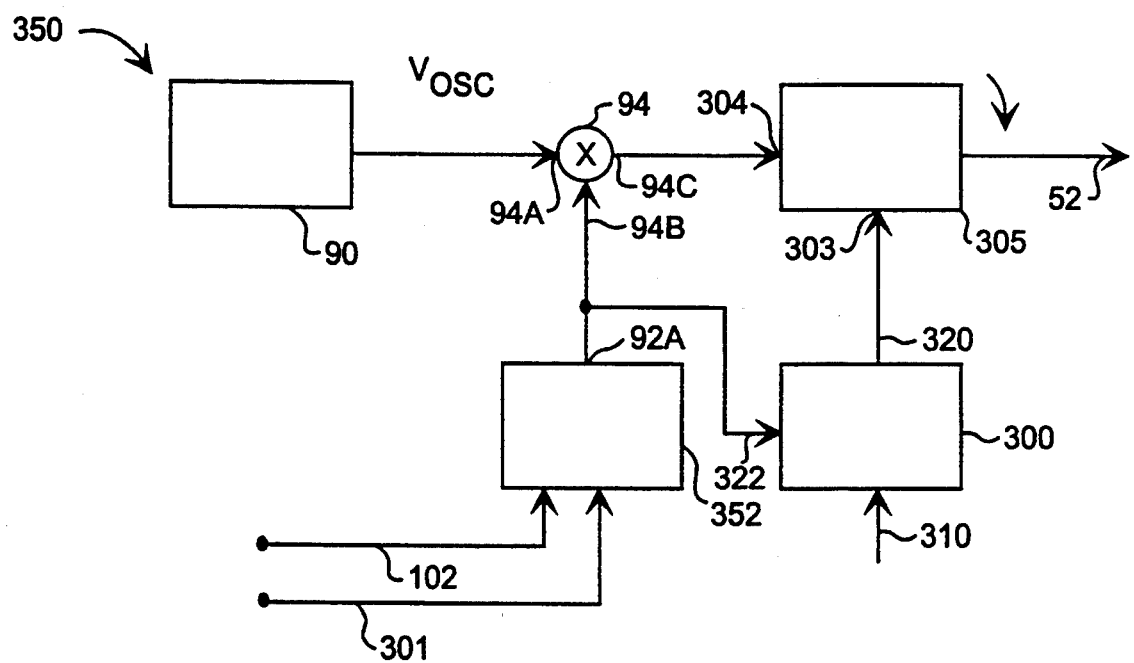
FIG. 9 is a schematic block diagram of a metering signal generator employing a gain control circuit in accordance with yet another embodiment of the present invention.

FIG. 9 is a schematic block diagram of a metering signal generator in accordance with another preferred exemplary embodiment of the present invention. In FIG. 9, metering signal generator 350 includes a sinewave generator 90, an up down ramp generator 352, a gain control 300, gain amplifier 305, and a multiplier 94. Metering signal generator 350 operates similarly to metering signal generator 50 discussed with reference to FIG. 3, wherein like designators indicate like components.

Ramp generator 352 generates a ramp value (such as 0 to 160) at output 92A similar to ramp signal 121 discussed with reference to FIG. 6. Ramp generator 352 internally counts from 0 to a threshold or maximum value (such as 159). The value from zero to the maximum value is provided as the ramp value at output 92A. Ramp generator 352 is similar to ramp generator 92 discussed with reference to FIG. 5. Up/down ramp generator 352 includes hold input 102 and an activate input 301.

Gain control 300 includes a gain input 310, a gain output 320, and a ramp input 322. Gain amplifier 305 includes a gain input 303 which is coupled to gain output 320 of gain control 300 and a signal input 304 which is coupled to output 94C of multiplier 94. Gain amplifier 305 is preferably a multiplier.

Figure 10:
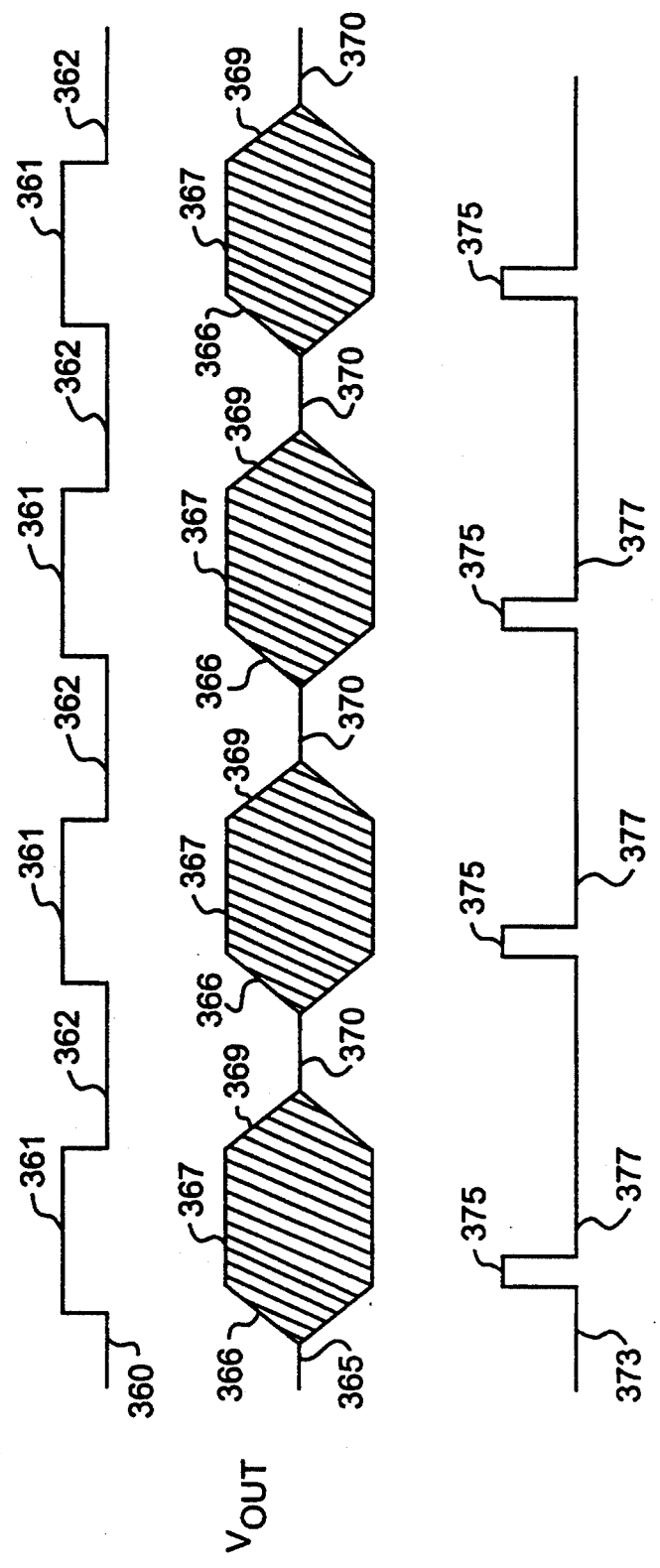
FIG. 10 is a waveform diagram of signals associated with the metering signal generator illustrated in FIG. 9.

The operation of metering signal generator 350 is described below with reference to FIGS. 9 and 10. FIG. 10 is a waveform diagram of signals associated with the metering signal generator illustrated in FIG. 9. An activate ramp signal 360 is provided on active ramp input 301 of ramp generator 352 and includes an ON state 361 and an OFF state 362. A metering signal 365 is provided at metering signal output 52 by gain amplifier 305. Metering signal 365 has an ascending portion 366, a maximum portion 367, a descending portion 369 and an OFF state 370. A hold signal 373 is provided at hold input 102 and includes an ON state 375 and an OFF state 377.

The product of the sinewave from sinewave generator 90 at input 94A and the ramp value at input 94B is provided as a ramp signal at output 94C of multiplier 94. The ramp signal is provided to input 304 of gain amplifier 305 which amplifies (multiplies) the product by a gain factor ($gain_n$) provided at gain input 303. Preferably, the gain factor is less than 1. Gain amplifier 305 provides the ramp signal multiplied by the gain factor signal 365 at metering signal output 52.

In operation, when activate ramp signal 360 changes from OFF state 362 to ON state 361, ramp generator 352 begins incrementing the ramp value (starting at zero) and provides the ramp value at output 92A to input 94B of multiplier 94 and ramp input 322 of gain control 300. The ramp value increases (creating ascending portion 366 of metering signal 365 in FIG. 10) until either an ON state 375 of hold signal 373 is provided or the ramp value reaches a maximum value. Hence, metering signal 365 is at maximum portion 367 (or threshold) when the ramp value is at the maximum value or ON state 375 is provided. If the maximum ramp value is reached, ramp generator 352 continues to provide a maximum ramp value until OFF state 362 of activate ramp signal 360 is provided. If ON state 375 of hold signal 373 is provided, ramp generator 352 ceases to increment the ramp value and provides the same ramp value until OFF state 362 is provided. Upon receiving OFF state 362, ramp generator 352 decreases the ramp value until the ramp value reaches zero (creating descending portion 369 of metering signal 365). When ramp generator 352 provides zero for a ramp value, metering signal 365 is in an OFF state 370. Metering signal 365 remains in OFF state 370 until active metering signal 360 changes from OFF state 362 to ON state 361.

Gain control 300 advantageously operates to produce a desired level for metering signal 365 at metering signal generator output 52 independent of load conditions when subscriber line 20 is in a steady state (impedance of subscriber line 20 not changing). Gain control 300 also advantageously operates to ramp up metering signal 121 as slowly as possible (having ascending portion 366 be as gradual as possible). A slow ramp up of metering signal 365 (large rise time of portion 366) reduces noise on subscriber line 20 created by metering signal 365.

Gain control 300 receives a user programmable gain factor (programmed gain factor) at gain input 310 similar to programming input 51 discussed with reference to FIG. 3. Gain input 310 allows the user to provide a factor for programming the gain of metering signal 365 produced by metering signal generator 350. Gain control 300 adjusts the gain factor in accordance with the ramp value provided at ramp input 322.

Preferably, gain control 300 operates to provide a gain factor to gain input 310 so that the metering signal 365 reaches its maximum portion 367 when ramp value reaches a maximum value. Thus, ascending portion 366 is ensured of having a slow rise time. Therefore, the metering signal 365 should reach its maximum portion 367 when ramp generator 352 provides the maximum ramp value or near the maximum ramp value. Metering signal 365 ramps up as slowly as possible in order to advantageously decrease noise associated with metering signal 365.

If ramp generator 352 is receiving ON state 373 at hold input 102, metering signal 365 is reaching maximum portion 367 before ramp generator 352 generates a maximum ramp value (such as a value 159). In response to this condition, gain control 300 provides a smaller gain factor at gain output 320 so that the ramping up of metering signal 118 is slowed. Thus, gain control 300 attempts to adjust the gain factor at gain output 320 so that ramp generator 352 counts from 0 to a value at or near the maximum ramp value (159) before metering signal 365 reaches maximum portion 367.

In order to adjust the gain factor properly, gain control 300 varies the gain factor according to the ramp value provided at ramp input 323 when maximum portion 367 is reached. Thus, in order to adjust the gain factor properly, gain control 300 must vary the gain factor according to the ramp value reached when maximum portion 367 of metering signal 365 is reached. For example, if ramp generator 352 counts up to the maximum ramp value (159), then the next gain factor (gain) is set to the programmed gain factor provided at input 310 because the ramp value is appropriately reaching the maximum ramp value.

If the ramp generator 352 was not allowed to count up to be maximum ramp value because ON state 375 of hold signal 373 was provided at hold input 102, the gain factor must be decreased to ensure that metering signal 365 is not ramping up too quickly. If the ramp value is below the maximum value but above an intermediate value ($120 \leq ramp < 159$), the ramp value is near (close enough to) the maximum value so the gain value need not be adjusted. If the ramp value is between an intermediate value and a maximum value, the next gain factor ($gain_n$) is preferably set equal to the previous gain factor ($gain_p$).

If the ramp value is less than the intermediate value and greater than a minimum value, the gain factor ($gain_n$) is expressed in the following equation:

$$gain_n = g_p \times \frac{ramp_p}{160} \times (1.14)^2$$

The factor $(1.14)^2$ is introduced to correct for measuring errors in the loop feedback such as from apparatus 38 in communication system 10 (FIG. 1).

If the ramp value does not reach a minimum value (56), gain control 300 assumes that ON state 375 of hold signal 373 was provided because subscriber line 20 was affected by noisy line conditions because ON state 375 was provided at such a low ramp value. For these cases, gain control 300 assumes that a ramp value of the minimum value (56) was actually reached and the $gain_n$ is calculated as:

$$gain_n = gain_p \times \frac{minimum}{100} \times (1.14)^2$$

Also, $gain_n$ is always set to be less than or equal to $gain_p$ if the maximum ramp value is not reached so that the ramp value should be larger than the previous ramp value. The above equations can be implemented in an algorithm performed by metering signal generator 350. The algorithm is described as follows:

$$gain_n = usergain \text{ if } ramp = max (159)$$

$$gain_n = g_p \text{ if } int (120) \leq ramp < max (159)$$

$$gain_n = g_p \times \frac{ramp}{160} \times (1.14)^2 \text{ if } min (56) \leq ramp < int (120)$$

$$gain_n = g_p \times \frac{56}{160} \times (1.14)^2 \text{ if } ramp < minimum (56)$$

where:
 ramp=ramp value;
 $g_p = gain_p$;
 min=minimum ramp value;
 int=intermediate ramp value; and
 max=maximum ramp value Thus, the above algorithm advantageously allows gain control 300 to provide an appropriate gain factor at gain input 303.

Preferably, metering signal generator 350 implements gain control 300 as a state machine with registers for storing ramp value, previous gain factor, and present gain factor. Preferably, the algorithm is implemented in two stages employing a combinatorial circuit and a multiplexer. The multiplexer is used to select the programmed gain factor when the maximum ramp value is reached. The combinatorial circuit is preferably a programmable logic array (PLA) for providing the arithmatic operations of the algorithm.

Figure 11:
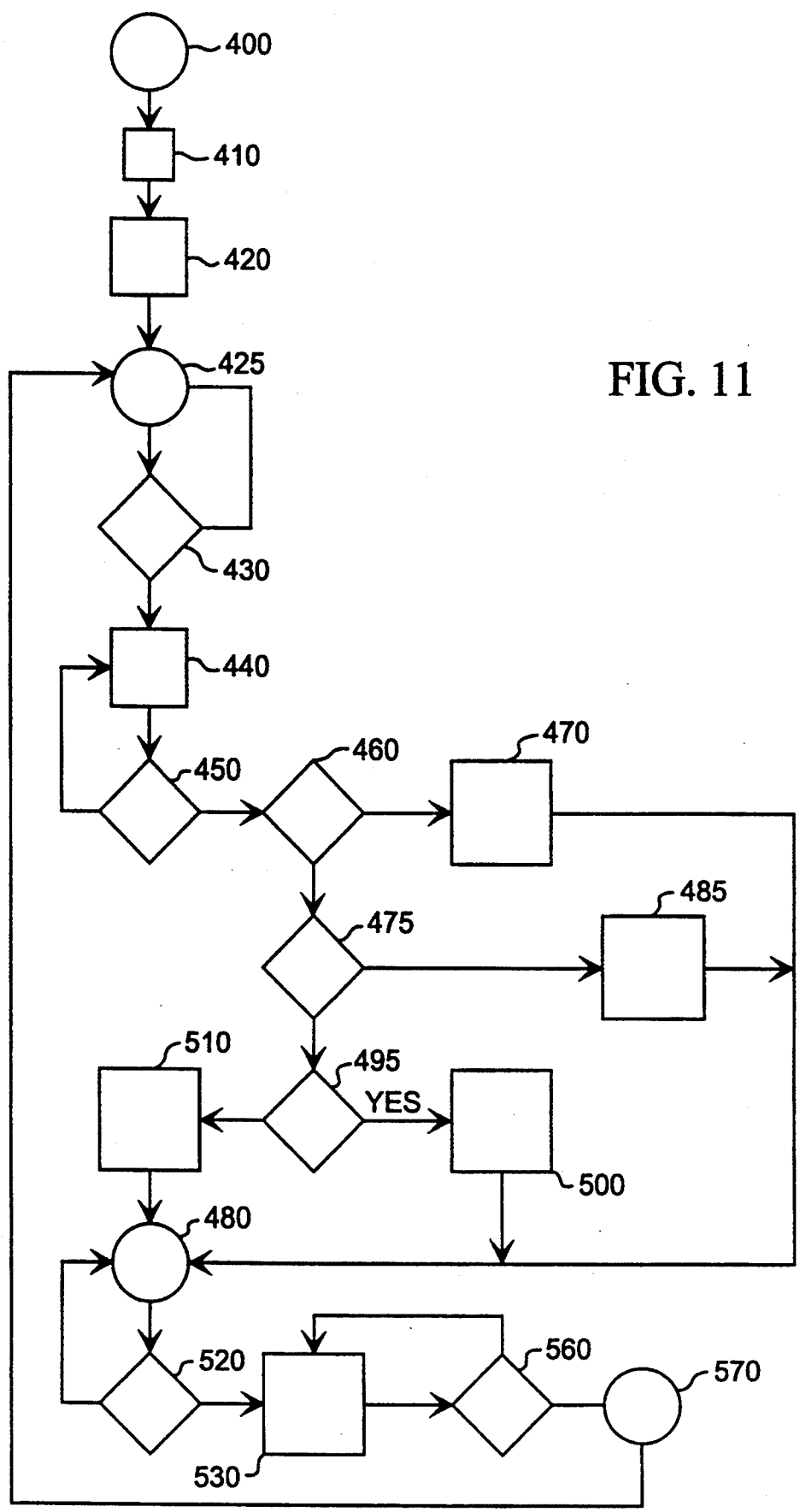
FIG. 11 is a flow chart showing the operation of the metering signal generator illustrated in FIG. 9.

FIG. 11 is a flow chart showing the operation of the metering signal generator illustrated in FIG. 10. Operation of metering signal generator 350 is described with reference to FIGS. 9, 10 and 11.

Beginning at start block 400, metering signal generator 350 is turned on at a block 410 and proceeds to a block 420. At block 420, the ramp value (ramp) at ramp generator output 92A is set equal to 0 and the previous gain factor ($gain_p$) is set equal to the user programmable gain input (programmed factor) provided at gain input 310. Metering signal generator 352 proceeds to a block 425 and then to a block 430. At block 430, if the active metering signal 360 is in ON state 361, metering signal generator 350 advances to block 440. If OFF state 362 of active signal 360 is present, gain control 300 returns to block 425.

In block 440, the ramp value at ramp output 92A is increased by one, and the meter signal generator 350 proceeds to a block 450. If the ramp value is equal to the maximum (159) at block 450, or ON state 375 of hold signal 373 is received at hold signal input 102, metering signal generator 350 proceeds to a block 460. If ON state 375 of hold signal 375 is not present or the maximum ramp value is not reached, metering signal generator 350 returns to block 440 and increases the ramp value by 1.

At block 460, the ramp value is compared to the maximum. If the ramp value is equal to the maximum (159), the gain factor ($gain_n$) is set to the user programmable gain (program) provided at gain input 310 in a block 470 and metering signal generator 350 proceeds to a block 480. If the ramp value has not reached its maximum (159), gain control 300 compares the ramp value to intermediate value (120) in a block 475. Preferably, gain control 300 determines if the ramp value is between the intermediate value (120) and the maximum value (159) at block 475. If the ramp value is between the maximum and intermediate values, the gain factor is set to the previous gain factor ($gain_p$) at a block 485 and metering signal generator 350 proceeds to block 480.

If the ramp signal is not between the intermediate value and the maximum value, metering signal generator 350 proceeds to a block 495 and determines if the ramp value is below the intermediate value (120) and above a minimum value (56). If the ramp value is between the intermediate and minimum values, $gain_n$ is set equal to:

$$gain_n = \frac{gain_p(ramp)\,(1.14)^2}{160}$$

in a block 500. Only the four most significant bits of the ramp value multiplied by 8 are used to simply the implementation of the above equation.

If the ramp value is not between the minimum value and the intermediate value, metering signal generator 350 proceeds to a block 510 and sets $gain_n$ equal to:

$$gain_n = \frac{gain_p 56\,(1.14)^2}{160}$$

and proceeds to block 480.

Metering signal generator 352 proceeds from block 480 to block 520 and determines if the activate metering signal 360 at input 301 is still in ON state 360. If the activate metering signal is still in ON state 361, metering signal generator 352 returns to block 480.

If the activate metering signal 360 is in OFF state 362, metering signal generator 350 advances to block 530 and proceeds to block 540 where the ramp value is decreased by one in block 550. Metering signal generator 350 determines if the ramp value is equal to zero at a block 560. If the ramp value is equal to zero, metering signal generator 350 proceeds to block 570 and then returns to block 425 for the next cycle of metering signal 365. If the ramp value is not equal to zero, metering signal generator returns to block 530.

It is to be understood that, while the detailed drawings and specific examples given describe a preferred exemplary embodiment of the present invention, they are for the purpose of illustration only. The apparatus of the invention is not limited to the precise details and conditions disclosed. For example, although the apparatus is shown as integrated on a SLAC device device in a communication system including a SLIC device, the apparatus may be employed integrated with other devices or separately. Also, the apparatus may be employed in other communication systems. Various changes may be made to the details disclosed without departing from the spirit of the invention which is defined by the following claims:

I claim:

1. An apparatus for controlling a first parameter of a metering signal in a communication system, said communication system including a transmit path and a metering signal generator, said metering signal generator including a control input and providing a metering signal at a first frequency to said transmit path, the apparatus comprising:

a digital filter having a filter output and a filter input, said filter input being coupled with said transmit path, said digital filter receiving transmitted signals at said filter input and providing filtered signals at said filter output, said filtered signals being above a second frequency, said second frequency being lower than said first frequency; and a threshold detector having a detector input coupled with said filter output and a detector output coupled with said control input, said threshold detector providing a control signal at said detector output when a second parameter of said filtered signals attains a predetermined relationship with a predetermined threshold, said metering signal generator controlling said first parameter in response to said control signal;

wherein said threshold detector further comprises:

a shift register coupled with said detector input, said shift register having a plurality of hierarchically arranged bit positions; and a logic device operatively coupled with said detector output, said logic device having at least one input coupled with at least one selected bit position of said plurality of hierarchically arranged bit positions, said logic device providing a logic signal at a logic output in response to a bit value at said at least one selected bit position.

2. An apparatus for controlling a first parameter of a metering signal in a communication system, said communication system including a transmit path and a metering signal generator, said metering signal generator including a control input and providing a metering signal at a first frequency to said transmit path, the apparatus comprising:

a high pass filter having a filter output and a filter input, said filter input being coupled with said transmit path, said high pass filter receiving transmitter signals at said filter input and providing filtered signals at said filter output, said filtered signals being above a second frequency, said second frequency being lower than said first frequency; and a threshold detector having a detector input coupled with said filter output and a detector output coupled with said control input, said threshold detector providing a control signal at said detector output when a second parameter of said filtered signals attains a predetermined relationship with a predetermined threshold, said metering signal generator controlling said first parameter in response to said control signal; and wherein said threshold detector further comprises:
a shift register coupled with said detector input, said shift register having a plurality of hierarchically arranged bit positions; and
a logic device operatively coupled with said detector output, said logic device having at least one input coupled with at least one selected bit position of said plurality of hierarchically arranged bit positions, said logic device providing a logic signal at a logic output in response to a bit value at said at lease one selected bit position.

3. An apparatus for controlling a first parameter of a metering signal as recited in claim 2 wherein said first frequency is either substantially 12 kilohertz or substantially 16 kilohertz.

4. An apparatus for controlling a first parameter of a metering signal as recited in claim 2 wherein said second frequency is at least 3.4 kilohertz.

5. An apparatus for controlling a first parameter of a metering signal as recited in claim 2 wherein said logic device is an OR function device.

6. An apparatus for controlling a first parameter of a metering signal as recited in claim 2 wherein said shift register has a sign bit position and wherein said threshold detector further comprises:
an AND function device having a first AND input coupled with said logic output, and a second AND input coupled with said sign bit position, said AND function device including an AND output, said AND output providing said control signal at said detector output.

7. An apparatus for controlling a first parameter of a metering signal as recited in claim 1 wherein the apparatus is integrated with a subscriber line audio-processing circuit.

8. An apparatus for controlling a first parameter of a metering signal as recited in claim 1 wherein said first and said second parameters are amplitude.

9. An apparatus for generating a metering signal in a communication system, said communication system including a subscriber line interface circuit (SLIC device) and a subscriber line, said SLIC device including an integrated semiconductor device having a metering signal input and an output operatively coupled to said subscriber line, the apparatus comprising:
metering signal generator coupled to said metering signal input, said metering signal generator providing said metering signal to said metering signal input for injection on said subscriber line through said integrated semiconductor device;
a program input coupled to said metering signal generator, said program input receiving a factor, said factor being related to a parameter of said metering signal;
wherein said metering signal generator provides said metering signal having said parameter;
wherein said communication system further includes a subscriber line audio-processing circuit (SLAC device) and said SLAC device is coupled with said SLIC device; and wherein said metering signal generator comprises a sinewave generator having a sinewave output and a first multiplier having a first input and a second input, the first input coupled with said sinewave output and the said second input coupled with said program input.

10. An apparatus for generating a metering signal in a communication system as recited in claim 9 wherein said metering signal generator is integrated with said SLAC device.

11. (Amended) An apparatus for generating a metering signal in a communication system as recited in claim 9 wherein said metering signal generator further comprises a ramp generator having a ramp output and a second multiplier having a first multiplier input and a second multiplier input, said first multiplier input coupled with said ramp output, said second multiplier input coupled with an output of said first multiplier.

12. An apparatus for generating a metering signal in a communication system as recited in claim 9 wherein said parameter is amplitude and said metering signal has a frequency of either 12 KHz or 16 KHz.

13. An apparatus for generating a metering signal in a communication system as recited in claim 12, wherein said communication system includes a subscriber line audio-processing circuit (SLAC device) and said apparatus is integrated with said SLAC device.

14. An apparatus for providing a metering signal in a communication system, said communication system including a ramp signal generator for providing a ramp signal at a ramp signal output said ramp signal ramping from a first level to a maximum level, said ramp signal being a sinusoidal signal, the apparatus comprising:
amplifier means for receiving said ramp signal and providing said metering signal, said amplifier means having a first input and a gain input, said first input coupled with said ramp signal output, said amplifier means providing said metering signal in response to a gain signal received at said gain input; and
gain control means for providing said gain signal, said gain control means having a gain control output coupled with said gain input, said gain control signal adjusting said gain signal so that said metering signal reaches a threshold level as said ramp signal nears or reaches said maximum level.

15. An apparatus for controlling a metering signal in a communication system as recited in claim 14 wherein said ramp signal generator includes a ramp counter, said ramp counter having a hold input for receiving a hold signal when said metering signal reaches said threshold level.

16. An apparatus for controlling a metering signal in a communication system as recited in claim 14 wherein said apparatus is integrated with a subscriber line audio-processing circuit.

17. An apparatus for controlling a metering signal in a communication system as recited in claim 15 wherein said ramp counter provides a ramp value to said ramp signal generator and said ramp signal is a product of a sinewave and said ramp signal.

18. An apparatus for controlling a metering signal in a communication system as recited in claim 17 wherein said gain control means includes a programmable input for receiving a programmed gain signal.

19. The apparatus for generating a metering signal as recited in claim 9 wherein the parameter is amplitude.

20. The apparatus for generating a metering signal as recited in claim 9 wherein the integrated semiconductor device is an amplifier.

* * * * *

UNITED STATES PATENT AND TRADEMARK OFFICE
CERTIFICATE OF CORRECTION

PATENT NO.   :   5,452,345
DATED        :   September 19, 1995
INVENTOR(S)  :   Zhou et al.

It is certified that error appears in the above-indentified patent and that said Letters Patent is hereby corrected as shown below:

In claim 2, column 19, line 15, change "lease" to --least--.

In claim 11, column 20, line 7, delete "(Amended)".

Signed and Sealed this

Twenty-fifth Day of June, 1996

Attest:

BRUCE LEHMAN

Attesting Officer       Commissioner of Patents and Trademarks